Patented Mar. 10, 1931

1,795,461

UNITED STATES PATENT OFFICE

DANIEL A. WILLIAMS, OF EAST ORANGE, NEW JERSEY, ASSIGNOR, BY MESNE ASSIGNMENTS, TO A. B. DICK COMPANY, OF CHICAGO, ILLINOIS, A CORPORATION OF ILLINOIS

STENCIL BLANK

No Drawing. Application filed September 15, 1923. Serial No. 663,001.

One object of the invention is to provide a durable, efficient stencil sheet which will not have the disadvantages of the present wax stencils or the so-called indestructible stencils which must be kept moistened while in use, or in other words one which will not crack, and which may be used without the application of any moistener.

Another object of the invention is to provide a board suitable for food containers and the like or to provide a lining suitable for such containers.

Other objects of the invention are to provide improved processes for manufacturing stencil sheets having the above stated characteristics.

Still other objects of the invention are to improve generally the simplicity and efficiency of such sheets and to provide a sheet of the kind stated which is durable, economical to manufacture and easily operated, and which will not deteriorate.

Other objects of the invention will appear as the description proceeds; and while herein details of the invention are described, the invention is not limited to these, since many and various changes may be made without departing from the scope of the invention as claimed.

My improved sheet is a tough, flexible, non-hygroscopic, water, grease and resin-proof blank suitable for being stencilized. This blank preferably comprises an open porous sheet of fibrous paper impregnated with a soluble cellulose acetate substance in combination with gums or resins such as are extracted from pine or fir trees of the natural order of coniferæ. If desired the paper blank may be of Japanese yoshino rice paper, but the invention is not so limited as other papers may be used. Said impregnating substance may be prepared as follows:

Acetate of cellulose is dissolved in acetone or glacial acetic acid at about 38° C. and when thoroughly dissolved, say after about 24 hours, it is diluted with benzol and alcohol is added as further solvent, while triacetin, tetrachlorethane and triphenyl phosphate are added as softeners. Gum or resin may also be added if desired.

The paper is then coated on one side only with this impregnating substance by being passed over a rotating roller dipping in said substance either cold (about 25° C.) or warm (38°–40° C.).

The paper is then dried for two hours, after which it is ready for use.

The acetate of cellulose above referred to is a flaky, whitish granular substance now on the market.

Instead of the acetate of cellulose I may substitute a nitro cellulose product, which I make as follows:

Cotton is dissolved in a solution of nearly equal parts by volume of nitric and sulfuric acids diluted in about 25 to 50 parts by volume of water. The resulting substance is insoluble in water and alcohol and is thoroughly washed in water and alcohol, to remove all traces of the acids. If desired only the nitric acid need be used.

This substance may be dried at room temperatures.

While the formula for the impregnating substance may be varied within wide limits, the following proportions by weight are given as examples only:

Example No. 1

| | |
|---|---:|
| Nitro cellulose or cellulose acetate | 1–10% |
| Acetone | 225.0 |
| Benzol | 75.0 |
| Alcohol | 60.0 |
| Triacetate | 10.0 |
| Tetrachlorethane | 4.0 |
| Triphenyl phosphate | 10.0 |

Example No. 2

| | |
|---|---:|
| Nitrocellulose or cellulose acetate | 12.6 |
| Acetone | 225.0 |
| Glacial acetic acid | 135.0 |
| Resin or other gums | 2.7 |
| Glycerine | 45.0 |

The stencil sheet as above prepared may be used on the typewriter without further treatment.

When preparing stock for containers or the like, the inner face, or under some circumstances the outer face or both faces of the stock, is impregnated with the impregnating substance. Or sheets as above described may be pasted or otherwise secured to the inner face of a suitable stock or board made up of one or more thicknesses of material of a kind or kinds depending upon the kind of container used. My improved stocks thus prepared are very useful when a stock is required that must be water and oil proof and proof against neutral solvents of oils, greases or resins, and where the flexibility must not appreciably change under extreme conditions of temperature or moisture and dryness. The improved material is very tough and is not easily injured, torn or broken.

While I have shown the preferred methods, I appreciate that minor changes may be necessary and without departing from the spirit of the invention, I do not wish to limit myself to the special arrangement and assembly of the chemicals as shown.

I claim as my invention:

1. A fluent composition for coating paper, comprising a cellulose ester, glycerine in amount several times the weight thereof, a relatively small amount of resin and a solvent, said composition being capable of yielding, upon evaporation of the solvent, a stable product which is soft and displaceable by the impact of type of a writing machine.

2. A fluent composition for coating paper, comprising cellulose acetate, glycerine in amount several times the weight thereof, a relatively small amount of resin and a solvent, said composition being capable of yielding, upon evaporation of the solvent, a stable product which is soft and displaceable by the impact of type of a writing machine.

DANIEL A. WILLIAMS.